US008869159B2

(12) United States Patent
Balmin et al.

(10) Patent No.: US 8,869,159 B2
(45) Date of Patent: *Oct. 21, 2014

(54) SCHEDULING MAPREDUCE JOBS IN THE PRESENCE OF PRIORITY CLASSES (71) Applicant: International Business Machines Corporation, Armonk, NY (US)

(72) Inventors: Andrey Balmin, San Jose, CA (US); Kirsten W. Hildrum, Hawthorne, NY (US); Rohit M. Khandekar, Elmsford, NY (US); Deepak Rajan, Fishkill, NY (US); Joel L. Wolf, Goldens Bridge, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/633,954

(22) Filed: Oct. 3, 2012

(65) Prior Publication Data
US 2013/0031558 A1   Jan. 31, 2013

Related U.S. Application Data (63) Continuation of application No. 13/116,378, filed on May 26, 2011.

(51) Int. Cl.
   *G06F 9/46*   (2006.01)
   *G06F 9/50*   (2006.01)

(52) U.S. Cl.
   CPC ... *G06F 9/46* (2013.01); *G06F 9/50* (2013.01)
   USPC .......................... 718/103; 718/102; 718/104

(58) Field of Classification Search
   None
   See application file for complete search history.

(56) References Cited

U.S. PATENT DOCUMENTS

| 6,763,520 B1 * | 7/2004 | Seeds .......................... 718/101 |
| 2002/0083063 A1 * | 6/2002 | Egolf .......................... 707/100 |
| 2003/0172104 A1 * | 9/2003 | Hooman et al. ................ 709/103 |
| 2003/0208521 A1 | 11/2003 | Brenner et al. |
| 2004/0117791 A1 | 6/2004 | Prasad et al. |
| 2005/0114860 A1 * | 5/2005 | Lin et al. ....................... 718/100 |
| 2005/0243853 A1 * | 11/2005 | Bitar et al. ..................... 370/432 |
| 2007/0143761 A1 * | 6/2007 | Deng ............................ 718/103 |
| 2009/0055829 A1 * | 2/2009 | Gibson .......................... 718/103 |
| 2009/0248976 A1 * | 10/2009 | Rotithor ........................ 711/113 |
| 2009/0300623 A1 * | 12/2009 | Bansal et al. .................. 718/102 |
| 2011/0265088 A1 * | 10/2011 | Devadhar et al. ............. 718/102 |
| 2012/0042319 A1 * | 2/2012 | Hildrum et al. ............... 718/104 |
| 2012/0174110 A1 * | 7/2012 | Hildrum et al. ............... 718/102 |

OTHER PUBLICATIONS

Wolf et al.; FLEX: A Slot Allocation Scheduling Optimizer for MapReduce Workloads; Middleware 2010; pp. 1-20.*

* cited by examiner

*Primary Examiner* — Abullah Al Kawsar
(74) *Attorney, Agent, or Firm* — Ryan, Mason & Lewis, LLP (57) ABSTRACT

Techniques for scheduling one or more MapReduce jobs in a presence of one or more priority classes are provided. The techniques include obtaining a preferred ordering for one or more MapReduce jobs, wherein the preferred ordering comprises one or more priority classes, prioritizing the one or more priority classes subject to one or more dynamic minimum slot guarantees for each priority class, and iteratively employing a MapReduce scheduler, once per priority class, in priority class order, to optimize performance of the one or more MapReduce jobs.

10 Claims, 8 Drawing Sheets

SCHEDULING MAPREDUCE JOBS IN THE PRESENCE OF PRIORITY CLASSES

CROSS-REFERENCE TO RELATED APPLICATIONS

This application is a continuation of U.S. patent application Ser. No. 13/116,378, filed May 26, 2011, incorporated by reference herein.

FIELD OF THE INVENTION

Embodiments of the invention generally relate to information technology, and, more particularly, to MapReduce scheduling in the presence of priority classes.

BACKGROUND OF THE INVENTION

Challenges exist in scheduling multiple concurrent MapReduce jobs while respecting constraints due to priority classes. Existing approaches to scheduling MapReduce work have not considered the notion of priority classes. Yet, the notion of priority classes is an entirely natural one. As an example, it might be that work in an "operations" class would be more important than work in an "analysts" class, which would be, in turn, more important than work in a "capability development" class. Further, these priority classes may be preemptive or non-preemptive in nature, or even a hybrid combination of both. There does exist at least one MapReduce scheduler which can optimize towards one of a multiplicity of several standard metrics. However, existing MapReduce scheduler approaches cannot optimize towards one of the standard metrics while simultaneously respecting the relative importance of priority classes.

SUMMARY OF THE INVENTION

Principles and embodiments of the invention provide techniques for scheduling MapReduce jobs in the presence of priority classes. An exemplary method (which may be computer-implemented) for scheduling one or more MapReduce jobs in a presence of one or more priority classes, according to one aspect of the invention, can include steps of obtaining a preferred ordering for one or more MapReduce jobs, wherein the preferred ordering comprises one or more priority classes, prioritizing the one or more priority classes subject to one or more dynamic minimum slot guarantees for each priority class, and iteratively employing a MapReduce scheduler, once per priority class, in priority class order, to optimize performance of the one or more MapReduce jobs.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Principles of the invention include scheduling MapReduce jobs in the presence of priority classes. The techniques detailed herein can include enforcing, for example, two sub-goals. The first sub-goal can be stated as: priority "rules," but subject to dynamic minimum slot guarantees for the individual priority classes. This prevents starvation of jobs in the lower classes, provided sufficient work in those classes exists, and is analogous to what a high quality MapReduce scheduler would do at the job level. The second sub-goal involves iteratively employing an intelligent MapReduce scheduler, class by class, to optimize performance, and repeating this iterative process until completion. In one or more embodiments of the invention, the class minima are appropriately allocated within classes amongst the jobs of that class. Thereafter, any additional "slack" slots in the cluster are allocated in an intelligent manner to the jobs.

One or more embodiments of the invention includes employing a scheduling scheme such as, for example, an appropriately enhanced version of FLEX iteratively, once per priority class, in priority class order. After each iteration, bookkeeping can be carried out to provide input data to the subsequent enhanced FLEX scheduling scheme. This bookkeeping includes, for example, creating a time-based histogram of the resources used thus far by the scheduler, in order to feed that data as resource to the next enhanced version of the enhanced FLEX scheduler. Also, an enhanced version of FLEX can be embedded, in one or more embodiments of the invention, in a MapReduce system (such as, for example, provided in Hadoop). The FLEX scheduler, which serves as a building block of one or more embodiments of the invention, is described in detail in U.S. patent application Ser. No. 12/853,925, filed Aug. 10, 2010, the disclosure of which is incorporated by reference herein.

Figure 1:
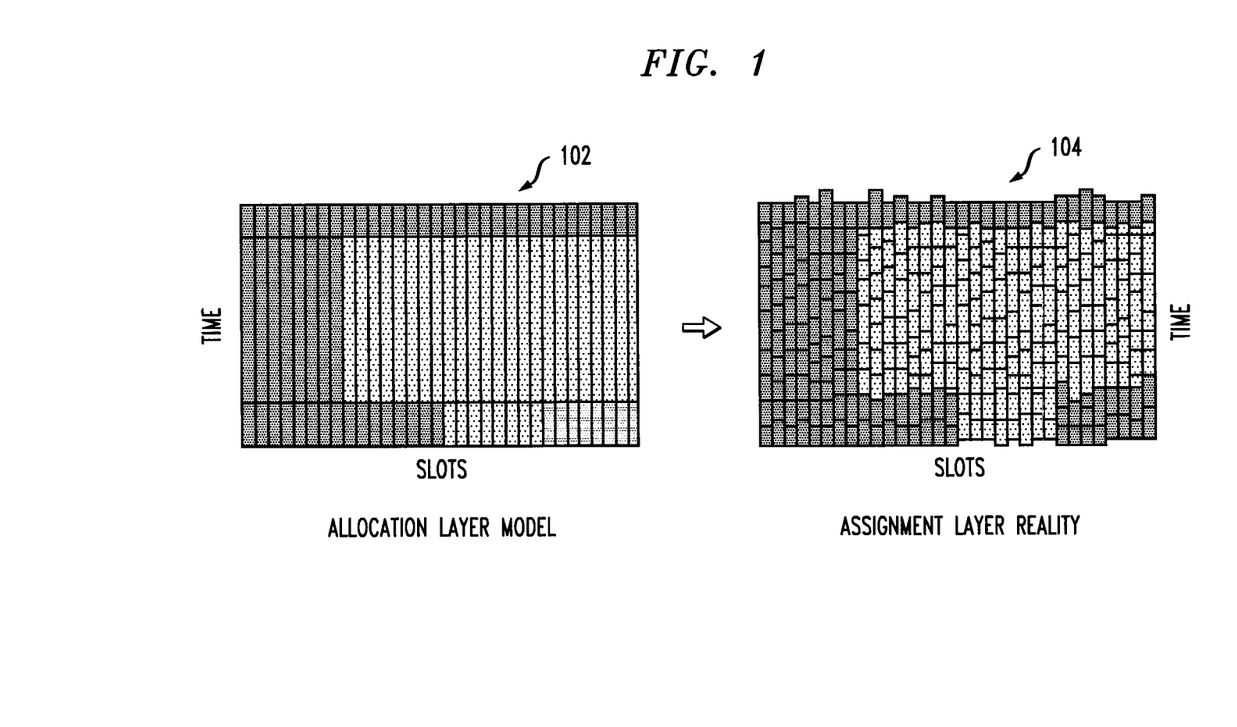
FIG. 1 is a diagram illustrating MapReduce scheduling examples, according to an embodiment of the present invention.

FIG. 1 is a diagram illustrating MapReduce scheduling examples, according to an embodiment of the present invention. By way of illustration, FIG. 1 depicts an allocation layer model 102 and an assignment layer reality 104. By way of example, FLEX, FAIR and First In, First Out (FIFO) are slot-based Allocation Layer schedulers. Slots are the basic unit of resource in MapReduce, and MapReduce jobs can include many small, independent tasks that get assigned to these slots. In an allocation layer, FLEX, FAIR and FIFO allocate numbers of slots to different jobs, and such allocations can vary over time. In an assignment layer, this lower layer can attempt to implement the decisions of the allocation layer.

As described herein, one or more embodiments of the invention include scheduling with priority classes. By way of illustration, each job belongs to a "priority class." An example can include three priority classes of "operations," "analysts" and "capability development." In such an example, priority class 1 ("operations") is more important than class 2 ("analysts"), which is more important than class 3 ("capability development").

A goal of such an example may include scheduling the jobs in these classes in an intelligent manner. A first sub-goal, as noted herein, can include assuming that priority "rules," but subject to "dynamic" minimum slot guarantees for the individual classes, which prevents starvation of jobs in the lower classes, and includes a priority class minima analogous to what FAIR and FLEX do at the job level. A second sub-goal can include using an intelligent FLEX-like scheduler to optimize performance, both within classes to allocate the class minima amongst the jobs, and to allocate any additional "slack" slots in the cluster to the jobs.

Figure 2:
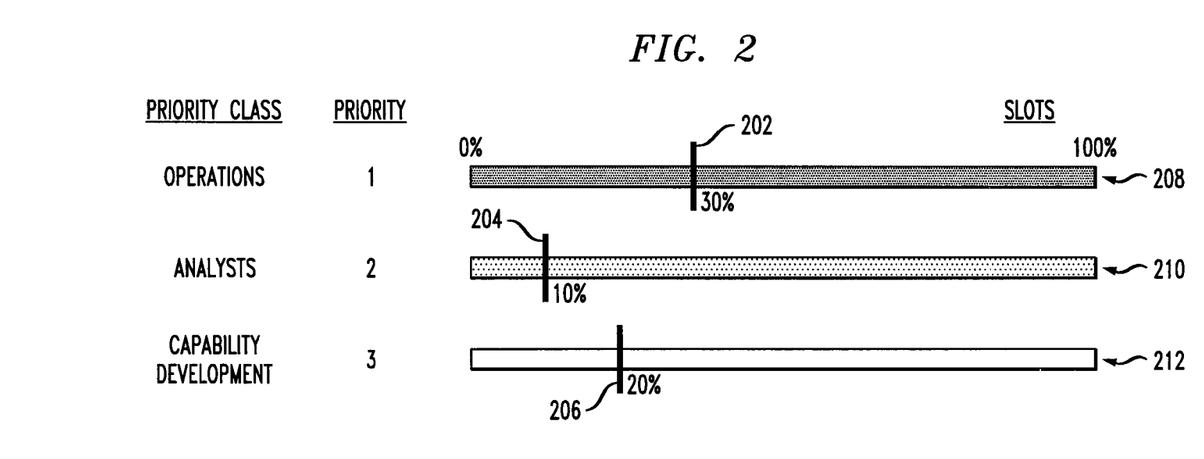
FIG. 2 is a diagram illustrating an apparatus for defining minimum slot guarantees by preemptive priority class, according to an embodiment of the present invention.

FIG. 2 is a diagram illustrating an apparatus for defining minimum slot guarantees by preemptive priority class, according to an embodiment of the present invention. Sliders 202, 204 and 206 can be adjusted to set dynamic minimum guarantees of priority class slots 208, 210 and 212. The sum of dynamic minima must be at most 100%, but possibly leaving spare, unallocated slots referred to as the "slack." In the instance of FIG. 2, slack is 100%−(30%+10%+20%)=40%. Slack will be given to jobs in preemptive priority order, and any unallocated slots within a priority class will be given by FLEX to jobs in a different class, also in preemptive priority order.

Figure 3:
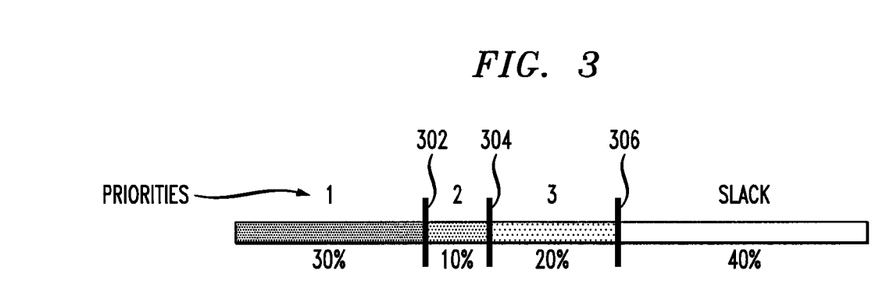
FIG. 3 is a diagram illustrating an alternative view of an apparatus for defining minimum slot guarantees by preemptive priority class, according to an embodiment of the present invention.

FIG. 3 is a diagram illustrating an alternative view of an apparatus for defining minimum slot guarantees by preemptive priority class, according to an embodiment of the present invention. Sliders 302, 304 and 306 set dynamic minimum guarantees of preemptive priority class slots. As above, the sum of dynamic minima must be at most 100%, possibly leaving spare, unallocated slots (slack), and in the FIG. 3 instance, slack is 100%−(30%+10%+20%)=40%. As also noted above, slack will be given to jobs in preemptive priority order, and any unallocated slots within a preemptive priority class will be given by FLEX to jobs in a different class, also in priority order.

According to a more general embodiment of the invention, it is possible, as noted, to refer to the three classes of FIG. 2 or FIG. 3 as preemptive priority classes. They may themselves be hierarchically organized, with multiple non-preemptive sub-classes contained within each.

Figure 4:
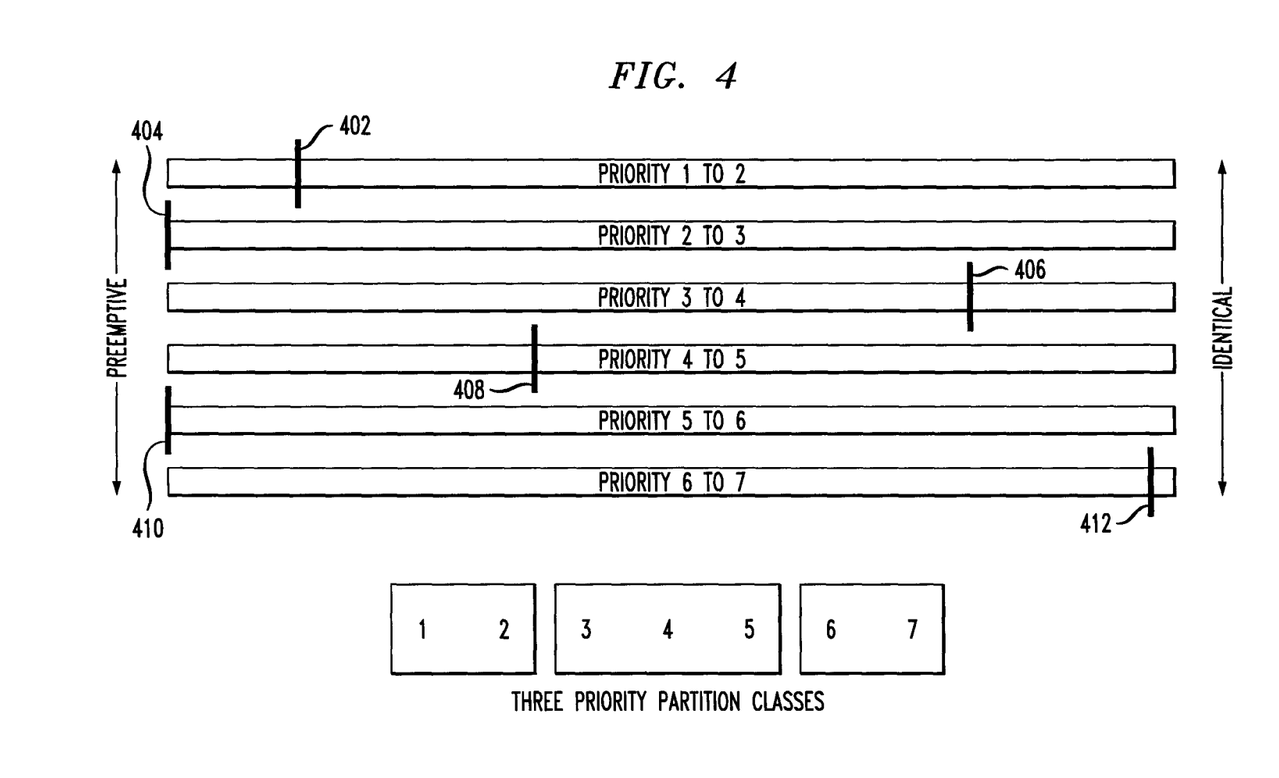
FIG. 4 is a diagram illustrating an apparatus for defining both preemptive priority classes and non-preemptive priority sub-classes, according to an embodiment of the present invention.

FIG. 4 is a diagram illustrating an apparatus for defining both preemptive priority classes and non-preemptive priority sub-classes, according to an embodiment of the present invention. By way of illustration, FIG. 4 depicts a dashboard for a three class and seven sub-class case, including new slider 402, as well as sliders 404, 406, 408, 410 and 412. The three classes are delineated via sliders 404 and 410, which are entirely left-justified. They determine that subclasses 1 and 2 are in the highest preemptive priority class, that subclasses 3, 4 and 5 are in the medium preemptive priority class, and that subclasses 6 and 7 are in the lowest preemptive priority class. Within each class there are also sliders, not left-justified, which decide how to divide up resource allocation amongst the different sub-classes in the class. Slider 402 divides the first class. Sliders 406 and 408 divide the second class. Slider 412 divides the third class. Sliders towards the left favor the previous sub-class over the subsequent class. Sliders towards the right favor more equality. Sliders which are completely right justified favor complete equality amongst the previous and subsequent sub-class.

Additionally subtleties, in accordance with one or more embodiments of the invention, can include the following. A job may have a minimum imposed by FAIR and FLEX, and a natural useful job maximum may exist as well (for example, if there are only a few tasks remaining). Also, there may be few or no active jobs in a priority class. A guiding scheduling principal includes not wasting slots, and so priority class minima is made dynamic and slack is allocated.

As noted above, FLEX, FIFO and FAIR are MapReduce schedulers. FLEX is a MapReduce scheduler that can optimize a variety (for example, 15) of user-chosen metrics while meeting some simple and reasonable constraints. FIFO is a MapReduce scheduler, but does not optimize anything and does not include metrics or constraints (and, as such, it can starve a small job if a big job arrives earlier). FAIR is a MapReduce scheduler, but does not formally optimize any of the standard scheduling metrics. It does meet one simple constraint in an effort to avoid starvation.

Scheduling optimization problems can have multiple key components. For instance, there can be a desire to (maximize or) minimize some expression which to describes the quality of a particular schedule (that is, maximize the good or minimize the bad). Examples of minimizing bad include average response time, stretch, number of tardy jobs, stretch, service level agreements (SLAs), makespan, etc. Examples of maximizing good would be throughput or SLA profits. Additionally, all schedules considered in this process must satisfy some conditions, typically to make the schedule "practical." In other words, some constraints are to be enforced in order to have an acceptable schedule. Examples include minimum numbers of slots per job, minimum numbers of slots per priority class, etc. Further, in all cases, the more restrictive the constraints, the worse the quality of the schedule.

All metrics considered in connection with one or more embodiments of the invention are based on functions of the completion times of the jobs. Examples can be based on the sum (or average) over all jobs, as well as the maximum (worst case) over all jobs. Also, for example, an average response time metric favors small jobs because they count the same as big jobs, and therefore makes more job users "happy." A stretch metric favors fairness because jobs get allocations roughly proportionally to the amount of work they require (equivalently, proportional to amount of time they would take if given all system resources). A number of tardy jobs metric can be common if jobs have deadlines (such as the end of a batch window), and should complete as many jobs as possible given the deadlines. An SLA metric can be used if jobs "pay" costs which depend on when they complete relative to multiple soft deadlines, possibly appropriate, for example, for a cloud environment. Additionally, a makespan metric indicates the maximum completion time over all the jobs. Such a metric is basically inversely related to throughput, so minimizing makespan would effectively maximize throughput.

Figure 5:
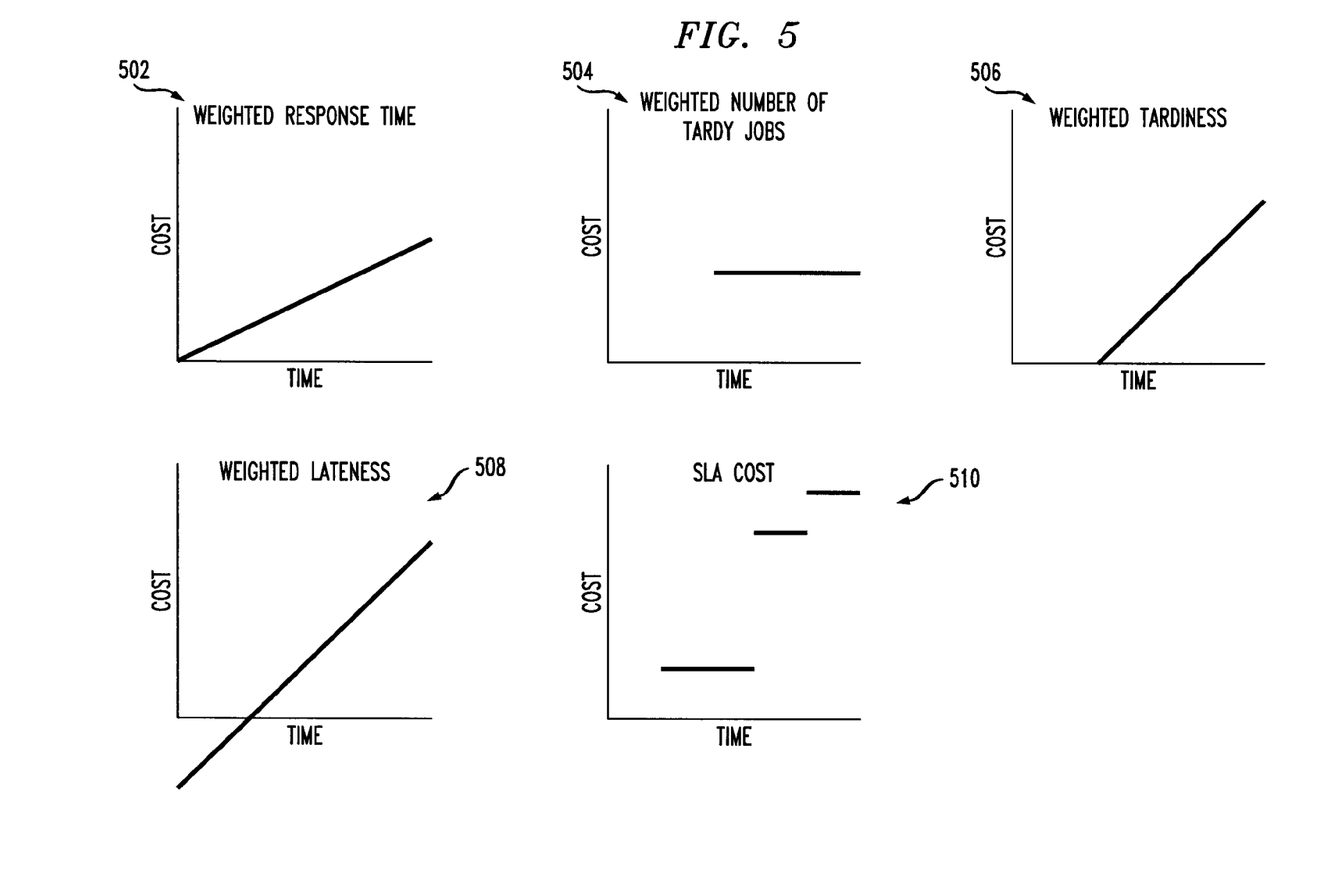
FIG. 5 is a diagram illustrating standard scheduling metrics, according to an embodiment of the present invention.

FIG. 5 is a diagram illustrating standard scheduling metrics, according to an embodiment of the present invention. By way of illustration, FIG. 5 depicts a weighted response time metric 502, a weighted number of tardy jobs metric 504, a weighted tardiness metric 506, a weighted lateness metric 508 and a SLA cost metric 510. In one or more embodiments of the invention, there are 16 metrics in all, given combinatorial choices involving whether the metric is maximum or average case performance, and whether or not there are weights in the objective function.

For many metrics, FLEX with zero or modest job minima will provide schedules while avoiding job starvation. For some metrics, job minima may be necessary. The use of a particular metric can depend on the application environment. The metric might also depend on the type of the job itself (for example, response time for ad hoc jobs, and number of tardy jobs for batch jobs). FLEX is flexible enough to largely handle these metrics, as one can install and experiment with FLEX as is (without priority classes) immediately, but FLEX will need to be significantly enhanced to handle priority class minima.

In particular, FLEX includes a scheme that has two major components. The first component produces a "preferred" ordering of jobs for a particular metric. This preferred ordering is then input to the second component, known as the Malleable Packing Scheme (MPS). For purposes of one or more embodiments of the invention, the preferred ordering scheme of the original FLEX scheduler can be used as is. However, the Malleable Packing Scheme must be significantly enhanced in order to handle time-based histograms of available allocation slots. Therefore, the FLEX scheduler, taken as a whole, may also be said to be significantly enhanced. Also, in one or more embodiments of the invention, iterative calls to an enhanced FLEX scheduler are made by preemptive priority classes and non-preemptive priority subclasses, together with bookkeeping on slot availability, job minima and maxima, priority class minima and slack. Each priority class can be optimized to a different, appropriate metric. Then, the entire iterative process can be repeated until either there are no idle processors or there is no further work required.

As detailed herein, one or more embodiments of the invention include providing a scheduler (for example, a modified version of FLEX) for MapReduce workloads that allocates all available slots in the distributed cluster to the jobs. A scheduling manager provides a "revised" minimum number of slots per job, and the minimum will be greater than or equal to the original minimum. Additionally, in one or more embodiments of the invention, there is no slack unless there is insufficient work to be performed. The sum of "revised" minimum slots will be the total number of slots or the total amount of work to be performed, so no FAIR proportional sharing slack rules are relevant. One or more embodiments of the invention also include allowing for constraints on the maximum number of slots per job (a generalization of FAIR), but FLEX will also attempt to optimize any of 16 different standard scheduling metrics within the given constraints.

Figure 6:
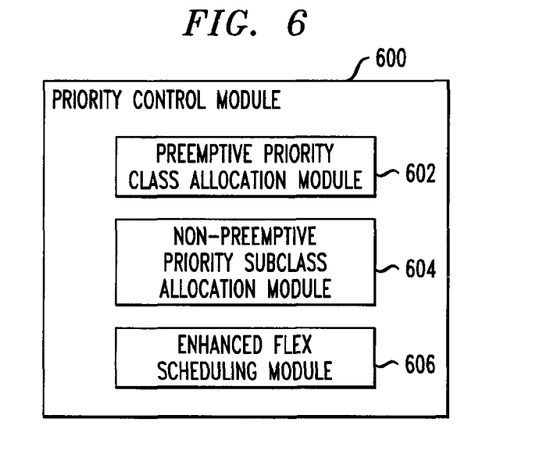
FIG. 6 is a block diagram illustrating an example embodiment, according to an aspect of the invention.

As described herein, one or more embodiments of the invention include a scheduling manager component. Refer now to FIG. 6, a block diagram illustrating an example embodiment, according to an aspect of the invention. Use of a scheduling manager can depend on multiple ideas. One or more embodiments of the invention will include a priority control component 600, that component containing three modules. There is a preemptive priority class allocation module 602, which apportions the total slots in the cluster to the individual priority classes. There is a non-preemptive priority sub-class module 604, which apportions the appropriately revised time-based histogram of slots allocated to the priority class to the individual priority subclasses. There is also an enhanced FLEX scheduling module 606. For example, depending on the metric, a preferred ordering of the jobs in the subclass is computed. Accordingly, given a preferred ordering of jobs, a high quality enhanced malleable packing scheme can be used to compute a schedule.

Figure 7:
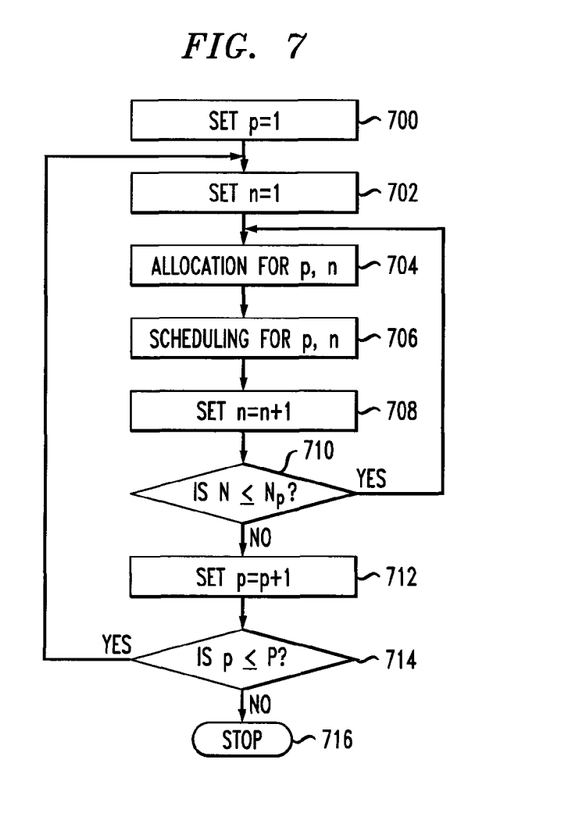
FIG. 7 is a flow diagram illustrating techniques for scheduling one or more MapReduce jobs in a presence of one or more priority classes, according to an embodiment of the invention.

Refer now to FIG. 7, a flow diagram illustrating techniques for scheduling one or more MapReduce jobs in a presence of one or more priority classes, according to an embodiment of the invention. Accordingly, the priority control component proceeds iteratively through the priority classes, in order of highest preemptive priority class to lowest preemptive priority class. The preemptive priority classes are indexed by p, from 1 to P. For each preemptive priority class p, the non-preemptive priority subclasses are indexed by n, from 1 to $N_p$. For each non-preemptive priority subclass (p,n), there will exist a minimum allocation $m_{p,n}$ of slots. This can be summed over n to compute a minimum number of slots $M_p$ of minimum slot allocations per preemptive priority class p.

As depicted in FIG. 7, step 700 includes setting the initial priority p to be 1. Initially, there is a total remaining slack S equal to the difference between the total number of slots M in the cluster and the sum over all preemptive priority classes of $M_p$. The number of slots given by the preemptive priority class allocation module to class 1 is a trivial time-based histogram of $M_1+S$. That is, it is time-invariant, always equal to this value. The additional slack slots will be shared in a fair manner by the sub-classes within the class.

Step 702 includes setting the initial non-preemptive priority to be 1. The number of slots given by the non-preemptive priority sub-class allocation module in step 704 to subclass (1,1) is $M_{1,1}+SM_{1,1}/M_1$. Additionally, step 706 includes scheduling the jobs in subclass (1,1) by finding a preferred ordering of the jobs in the sub-class and employing an enhanced Malleable Packing Scheme, as described herein. This schedule will use a number of allocation slots which is not time-invariant. Specifically, there will be a finite number of times $T_k$ at which the number of slots will change.

Step 708 includes incrementing n, and step 710 includes testing to see if n is less than or equal to $N_p$. If n is less than or equal to $N_p$, control is passed back to step 704, which schedules the jobs in the next sub-class. Note that past sub-class (1,1), all time-based histograms may be non-trivial, and this histogram is used by the enhanced Malleable Packing Scheme. If n is not less than or equal to $N_p$, control is passed to step 712, which increments p. Further, step 714 includes testing to see if p is less than or equal to P. If p is less than or equal to P, control is passed back to step 702. If p is not less than or equal to P, the process terminates at step 716 with a complete schedule.

Figure 8:
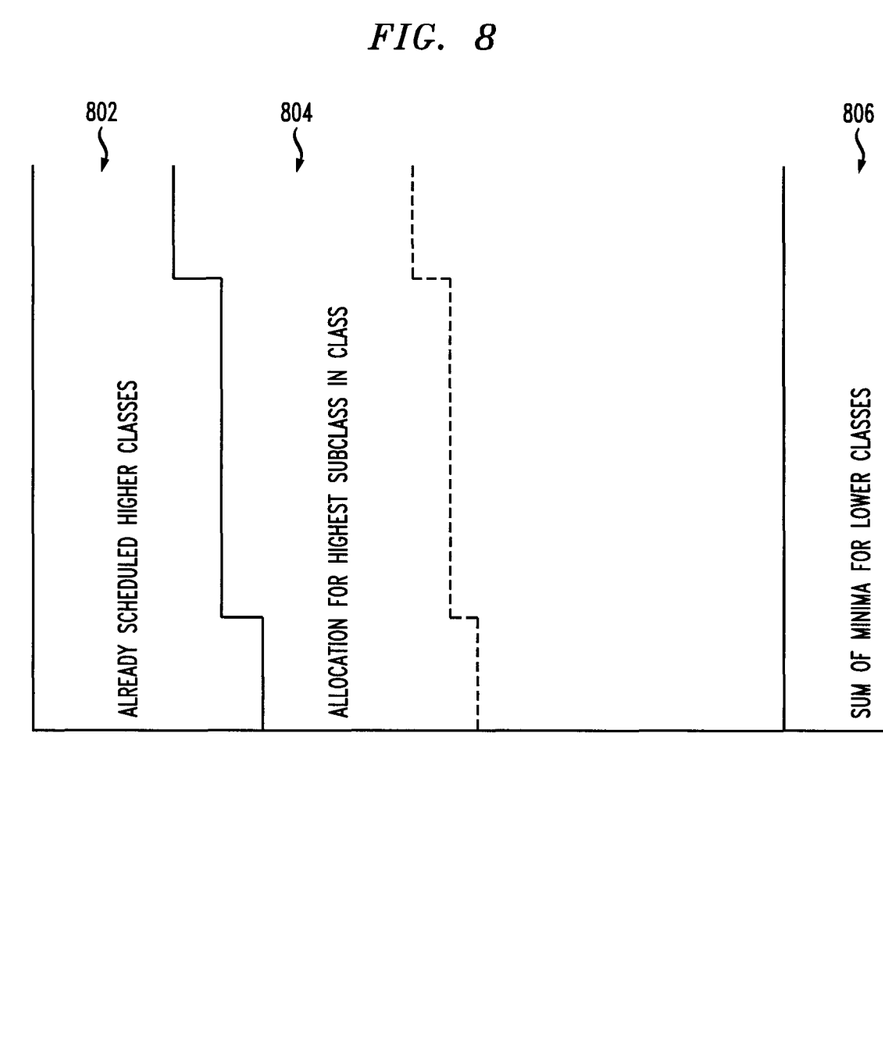
FIG. 8 is a diagram illustrating an example of the allocation of slots to a non-preemptive subclass within a preemptive priority class, according to an embodiment of the present invention.

FIG. 8 is a diagram illustrating an example of the allocation of slots to a non-preemptive subclass within a preemptive priority class, according to an embodiment of the present invention, and it also illustrates the time-based histogram that guides the number of slots available. Specifically, FIG. 8 depicts a portion 802 of already scheduled higher classes, a portion 804 of allocation for highest sub-class in a class, and a portion 806 for a sum of minima for lower classes. The allocation for the highest priority sub-class in the class is shown as a concrete example, but the diagram would be analogous for subsequent sub-classes.

Figure 9:
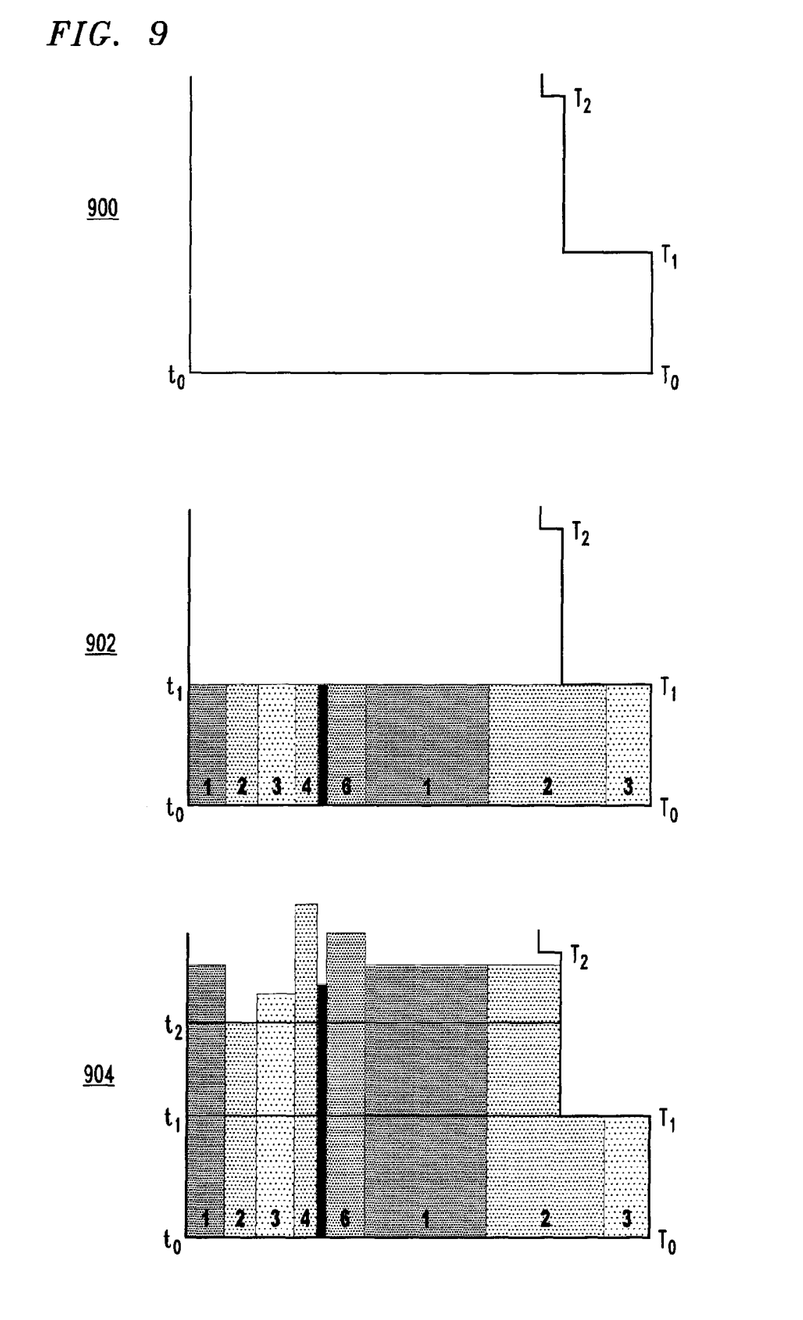
FIG. 9 illustrates the enhanced Malleable Packing Scheme employed by one or more embodiments of the present invention.

FIG. 9 illustrates the enhanced Malleable Packing Scheme employed by one or more embodiments of the present invention. This scheme starts with a preferred ordering of the jobs in a sub-class. In the original Malleable Packing Scheme component of the FLEX scheduler, the number of slots available was time-invariant. In one or more embodiments of the invention this is generalized to allow for time-based histograms of available slots. Note the times $T_k$ in the steps in FIG. 9, where $T_0$ is the start time of the scheduler and $T_1$, $T_2$ and so on, represent the times at which the histogram changes. Step 900 represents the status as the packing begins. Step 902 represents the status at the end of the first stage of packing, and step 904 represents the status at the end of the second stage.

There are six jobs in this illustrative example, represented by indices 1 through 6. In step 902, the packing proceeds by allocating the minimum number of slots to each job, in preferred order. The remaining slack is then scheduled in preferred order, with job 1 getting additional allocation up to its maximum, job 2 getting additional allocation up to its maximum, and job 3 getting a portion of that additional allocation until there are no further slots. Given this allocation, each job will finish at some time, which in this example is beyond the time $T_1$ of the first histogram change. The enhanced Malleable Packing Scheme cuts off the schedule at that point, leaving some additional work remaining for each of the jobs.

After performing bookkeeping (as described herein), the scheme continues with step 904. In this step, there are fewer slots available, and after each job gets its minimum, only job 1 gets an allocation up to its maximum. Job 2 gets a partial allocation. Each job will again finish at some time, as shown in step 904, and in this example job 2 completes before the time $T_2$ of the next histogram change. The enhanced Malleable Packing Scheme cuts off the schedule at this point, leaving some additional work for jobs 1 and 3 through 6. This process repeats until all jobs have been scheduled, thus creating a revised histogram of useful work.

More formally, in an enhanced malleable packing scheme, input can include, for example, a preferred ordering of jobs. It can also include a time-based histogram of available slots. The changes occur at times $T_k$ and there are $S_k$ available slots between times $T_{k-1}$ and $T_k$. This can include a total number of slots R based on phase, where each job has a positive minimum arising from the FAIR scheduler. Each job can also have a maximum, if appropriate. Setting the maximum $\max_j$ to P is equivalent to "removing" this constraint for job j. Additionally, the output for a malleable packing scheme can include malleable allocation of slots to jobs that meets constraints.

An algorithm, in accordance with one or more embodiments of the invention, can include the following:

Initialization: Create list K of all jobs, in preference order
Set time T to be $T_0$
While list is not empty do {

-continued

Allocate minimum number of slots $m_k$ to each job k in K
Set L = K, with implied ordering
Compute slack S = S−$\Sigma m_k$
While (S ≥ 0 | L ≠ ∅) do {
    Allocate most preferred job k in L min (S, $M_k$ − $m_k$) slots
    Remove job j from L
    Recompute S = S−min (S, $M_j$ − $m_j$)
}
If (Exists job j completing before next histogram change time $T_{k+1}$)
    Remove j from K
    Reset T to be this completion time
} else {
    Reset T to be $T_{k+1}$
Bookkeeping to compute remaining work through this completion time
}

Additionally, in one or more embodiments of the invention, a FLEX scheduler can be integrated in a MapReduce system (such as, for example, Hadoop). The FLEX scheduler overrides the one method in FAIR, and a current implementation minimizes average response time. Minimal changes are made to FAIR scheduler code. For example, the scheduler can be activated as an "advanced" scheduler (configuration parameter), while nothing else in the critical path is modified. One or more embodiments of the invention can also include a developed infrastructure for logging task processing times. Such an aspect can be needed for optimizing metrics, builds/maintains models of job processing time estimates, and sets minimum slots of new jobs to 1.

Figure 10:
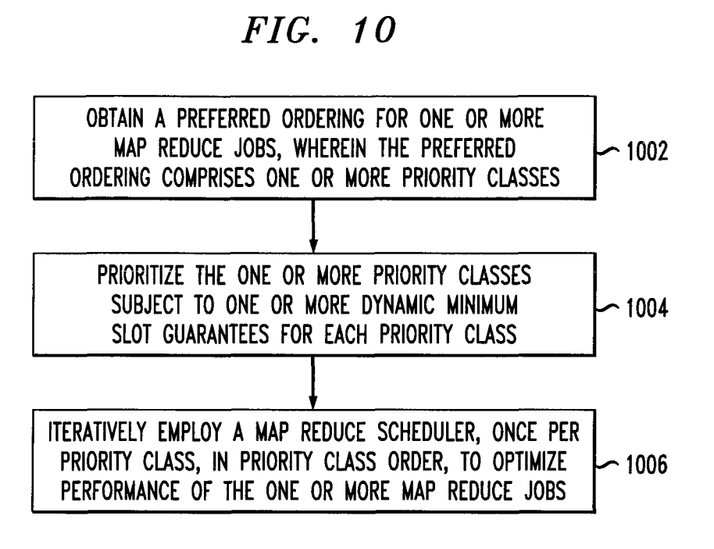
FIG. 10 is a flow diagram illustrating techniques for scheduling one or more MapReduce jobs in a presence of one or more priority classes, according to an embodiment of the present invention.

FIG. 10 is a flow diagram illustrating techniques for scheduling one or more MapReduce jobs in a presence of one or more priority classes, according to an embodiment of the present invention.

Step 1002 includes obtaining a preferred ordering for one or more MapReduce jobs, wherein the preferred ordering comprises one or more priority classes (wherein each job belongs to a priority class). This step can be carried out, for example, using an enhanced FLEX scheduling module.

Step 1004 includes prioritizing the one or more priority classes subject to one or more dynamic minimum slot guarantees for each priority class. This step can be carried out, for example, using a preemptive priority class allocation module. Prioritizing the priority classes subject to one or more dynamic minimum slot guarantees for each priority class also prevents starvation of jobs in lower priority classes. Additionally, within the priority classes, class minima are appropriately allocated amongst the one or more jobs.

Step 1006 includes iteratively employing a MapReduce scheduler, once per priority class, in priority class order, to optimize performance of the one or more MapReduce jobs. This step can be carried out, for example, using a non-preemptive priority sub-class module. Iteratively employing a MapReduce scheduler, once per priority class, in priority class order can include allocating any additional slack slots in a cluster in an intelligent manner to the one or more jobs.

The techniques depicted in FIG. 10 can also include repeating the iterative process until there are no idle processors in the MapReduce schedule or no further need for additional allocations. Also, in one or more embodiments of the invention, bookkeeping is performed after each iteration to provide input data to a subsequent scheduling scheme. One or more embodiments of the invention additionally include optimizing a scheduling metric within one or more given constraints. Also, the techniques depicted in FIG. 10 can include providing, via a scheduling manager component, a revised minimum number of slots per job, wherein the minimum is greater than or equal to an original minimum.

One or more embodiments of the invention can also include implementing a Malleable Packing Scheme and implementing only a first layer of malleable packing with an expectation that a revised schedule will arrive in sufficient time. Additionally, the techniques detailed herein also include re-optimizing performance of the one or more MapReduce jobs when input data changes (such as, for example, task completion, new job arrival, etc.).

The techniques depicted in FIG. 10 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a priority control module, a preemptive priority class allocation module, a non-preemptive priority subclass allocation module, and an enhanced FLEX scheduling module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 10 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 11:
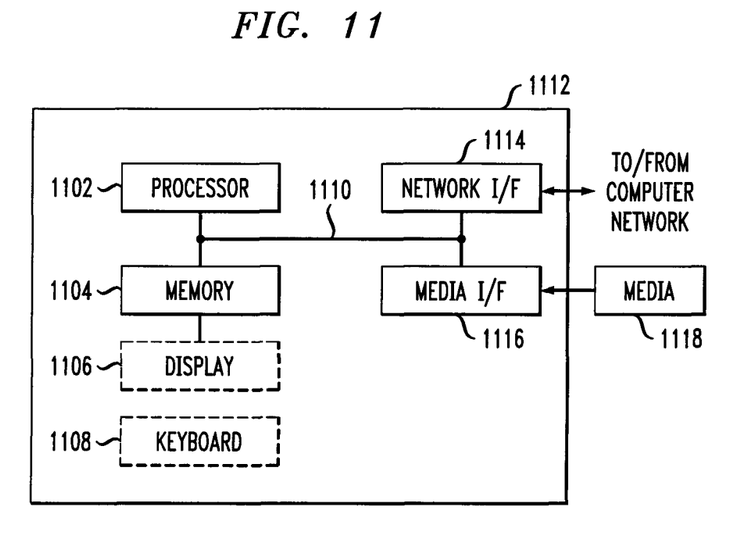
FIG. 11 is a system diagram of an exemplary computer system on which at least one embodiment of the invention can be implemented.

One or more embodiments can make use of software running on a general purpose computer or workstation. With reference to FIG. 11, such an implementation might employ, for example, a processor 1102, a memory 1104, and an input/output interface formed, for example, by a display 1106 and a keyboard 1108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1102, memory 1104, and input/output interface such as display 1106 and keyboard 1108 can be interconnected, for example, via bus 1110 as part of a data processing unit 1112. Suitable interconnections, for example via bus 1110, can also be provided to a network interface 1114, such as a network card, which can be provided to interface with a computer network, and to a media interface 1116, such as a diskette or CD-ROM drive, which can be provided to interface with media 1118.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1102 coupled directly or indirectly to memory elements 1104 through a system bus 1110. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1108, displays 1106, pointing devices, and the like) can be coupled to the system either directly (such as via bus 1110) or through intervening I/O controllers (omitted for clarity).

Network adapters such as network interface 1114 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1112 as shown in FIG. 11) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1118 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 6. The method steps can then be carried out using the distinct software modules and/or sub-modules of the system, as described above, executing on one or more hardware processors 1102. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, scheduling MapReduce jobs in the presence of priority classes.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for scheduling MapReduce jobs within and across multiple priority classes, wherein the method comprises:
   obtaining a preferred ordering for multiple MapReduce jobs within each of the multiple priority classes based on a given metric, wherein each of the multiple priority classes comprises two or more of the multiple MapReduce jobs, and wherein the given metric is selected from a plurality of metrics based on a job type of the multiple MapReduce jobs, wherein the plurality of metrics comprises (i) a metric associated with weighted response time, (ii) a metric associated with weighted number of tardy jobs, (iii) a metric associated with weighted tardiness, (iv) a metric associated with weighted lateness and (v) a metric associated with service level agreement cost;
   prioritizing the multiple priority classes subject to one or more dynamic minimum slot guarantees for each priority class to generate an ordering of the multiple priority classes; and
   iteratively employing a MapReduce scheduler, according to the ordering of the multiple priority classes, to allocate resources at the level of priority classes to execute all of the two or more MapReduce jobs within a first priority class from the ordering of the multiple priority classes prior to executing a MapReduce job in the subsequent priority class in the ordering of the multiple priority classes, wherein said executing the two or more MapReduce jobs within the first priority class comprises executing the two or more MapReduce jobs according to said preferred ordering for the MapReduce jobs within the first priority class.

2. The method of claim 1, further comprising repeating said iteratively employing a MapReduce scheduler until there are no idle processors in the MapReduce schedule or no further need for additional allocations.

3. The method of claim 1, wherein said prioritizing comprises preventing starvation of one or more jobs in lower priority classes.

4. The method of claim 1, wherein within the multiple priority classes, class minima are appropriately allocated amongst the multiple jobs.

5. The method of claim 1, wherein said iteratively employing a MapReduce scheduler comprises allocating any additional slack slots in a cluster in an intelligent manner to one or more jobs.

6. The method of claim 1, further comprising performing bookkeeping after each iteration of employing the MapReduce scheduler to provide input data to a subsequent scheduling scheme.

7. The method of claim 1, further comprising optimizing a scheduling metric within one or more given constraints.

8. The method of claim 1, further comprising providing, via a scheduling manager component, a revised minimum number of slots per job, wherein the minimum is greater than or equal to an original minimum.

9. The method of claim 1, further comprising implementing a Malleable Packing Scheme and implementing only a first layer of malleable packing with an expectation that a revised schedule will arrive in sufficient time.

10. The method of claim 1, further comprising re-optimizing performance of the multiple MapReduce jobs when input data changes.

* * * * *